United States Patent [19]

Meyers et al.

[11] Patent Number: 4,546,787

[45] Date of Patent: Oct. 15, 1985

[54] HYDRAULIC VALVE CONTROL DEVICE

[75] Inventors: Graham J. Meyers, Frankston; Barry L. Hudson, Lower Templestowe; Desmond J. Berry, Mt. Eliza, all of Australia

[73] Assignee: Clark Rubber Limited, Clayton, Australia

[21] Appl. No.: 390,546

[22] Filed: Jun. 21, 1982

[30] Foreign Application Priority Data

Jun. 22, 1981 [AU] Australia .................. PE9380/81

[51] Int. Cl.⁴ ............................................. F16K 21/00
[52] U.S. Cl. ............................ 137/119; 137/624.12; 137/625.11; 137/624.18; 251/249; 251/249.5
[58] Field of Search ............ 137/625.11, 624.12, 137/624.18, 119, 625.46, 625.18, 625.19; 251/249, 249.5, 56, 163; 210/169, 167

[56] References Cited

U.S. PATENT DOCUMENTS

| | | | |
|---|---|---|---|
| 2,050,972 | 8/1936 | Kimbirl | 137/145 |
| 2,696,082 | 12/1954 | Fouron et al. | 251/249 |
| 3,307,579 | 3/1967 | Beddoes | 137/624.18 |
| 3,319,655 | 5/1967 | Palmer | 137/624.18 |
| 3,513,981 | 5/1970 | Mendelow | 137/625.18 |
| 3,640,310 | 2/1972 | Erlich | 137/625.46 |
| 3,721,268 | 3/1973 | Erlich et al. | 137/625.46 |
| 3,730,208 | 5/1973 | Lewis | 137/119 |
| 3,853,145 | 12/1974 | Judd | 137/624.18 |
| 3,924,652 | 12/1975 | Kah, Jr. | 137/119 |
| 4,090,532 | 5/1978 | Story, Jr. | 137/624.2 |
| 4,372,334 | 2/1983 | Paul, Jr. | 137/119 |

FOREIGN PATENT DOCUMENTS 0029939 8/1960 German Democratic Rep. .

Primary Examiner—Richard V. Fisher
Assistant Examiner—Wanda L. Millard
Attorney, Agent, or Firm—Fleit, Jacobson, Cohn & Price

[57] ABSTRACT

A motor-operable fluid valve for a pump includes a valve body defining an open central portion, at least one high pressure inlet port in fluid communication with the open central portion, a plurality of lower pressure inlet and/or outlet ports in fluid communication with the open central portion via an array of flow passages, and a valve rotor having a plurality of openings and movably disposed within the open central portion between the line of flow from the high pressure to the lower pressure ports. The valve rotor further includes a centrally mounted shaft operable to selectively connect inlet and outlet ports; said valve further comprising a rotational means on the shaft of the valve rotor and a drive gear cooperative with the rotational means and comprising a top face and a bottom face, the top face being sloped so as to form a cam such that when the drive gear is rotated the rotational means may be raised and lowered by the camming action.

21 Claims, 8 Drawing Figures

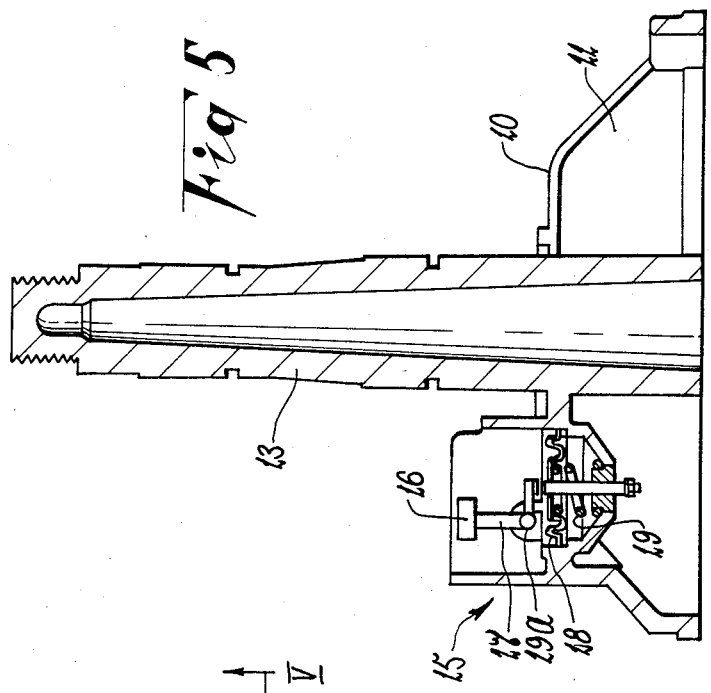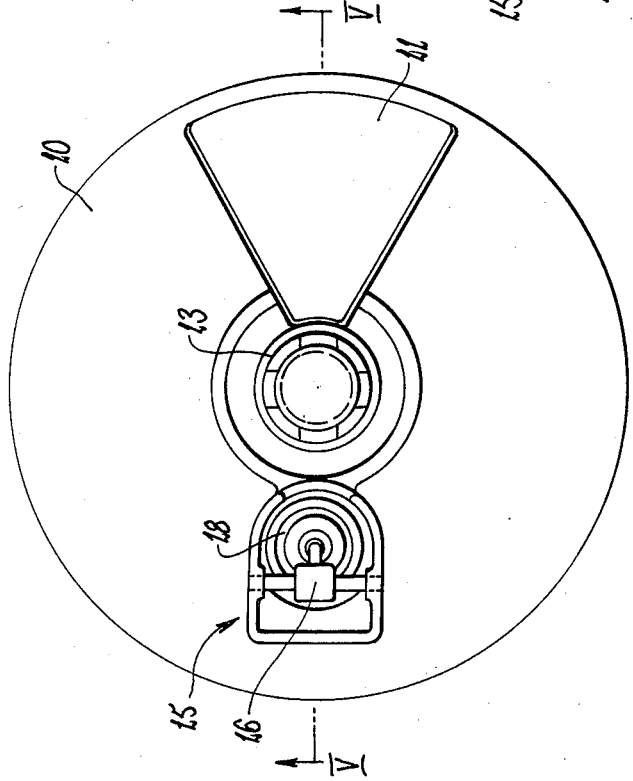

HYDRAULIC VALVE CONTROL DEVICE

Multiport valves permit fluid from one or more influent lines to be directed to one or more preselected effluent lines. Because they are capable of multiple function, such valves are widely used for fluid transportation systems in such areas as the chemical process industry, water treatment plants, swimming pools and other water circulation systems. In such applications, numerous attempts have been made to produce a valve which is capable of powered and preferably automatic operation. However, prior art attempts have been found to be deficient either due to the complexity of the control mechanisms used or by deficiencies inherent in the type of multiport valve to which the automatic system is restricted.

A particular disadvantage of the automatic control mechanisms of the prior art has been in relation to the sensing devices used. For example, where the valve is used in conjunction with a filter system e.g. a sand filter for use with swimming pools, the sensing devices in some prior art systems have measured the total back pressure offered to the pump. This arrangement is disadvantageous as the measurement of total back pressure is affected by a number of transient factors which are irrelevant to the functioning of the filter itself.

In relation to the multiport valve, many prior art valves comprise a lower housing portion having connecting means for both the influent and effluent lines and internal flow passages for connecting the flow within the valve to the valve seat, an upper housing portion connected to the lower housing portion at a position adjacent to the valve seat and a valve rotor disposed within the upper housing portion to seal against the valve seat and selectively direct the flow from an influent to an effluent line. The valve rotor is usually a disc having openings which correspond to influent and effluent lines which may selectively be aligned by rotation of the rotor to match the desired flow passages in the lower housing portion. Due to the fact that the fluid both enters and leaves via flow passages located within the lower housing portion the fluid must necessarily pass through the rotor twice in its passage from the influent line to the selected effluent line. This causes high differential pressure across the valve which may cause serious problems by reducing the flow rate, or overheating of the pump. Further, the fluid entering the valve via the lower housing portion also exerts a force upon the rotor which tends to lift it from the seat which will thus cause a tendency towards leakage across the rotor.

Moreover, the gaskets utilised to provide a valve seat seal between the valve rotor and the valve housing are usually formed from a rubber composition so that relatively low force need be applied to cause compression. While this is advantageous to sealing, it is detrimental to the life of the gasket. The gasket is quite susceptible to wear by abrasion, erosion and to deformation in use e.g. if the rotor is not properly lifted from the seat prior to its rotational motion to another position. In further prior art arrangements, spool valves have been used. However, sealing and 0-ring difficulties have also been a disadvantage of such arrangements.

Accordingly, it is an object of the present invention to overcome, or at least alleviate, some of the difficulties related to the prior art.

Accordingly, there is provided a motor-operable fluid valve for a pump, said valve comprising a valve body defining an open central portion, at least one high pressure inlet port in fluid communication with the open central portion, a plurality of lower pressure inlet and/or outlet ports in fluid communication with the open central portion via an array of flow passages, and a valve rotor having a plurality of openings and movably disposed within the open central portion between the line of flow from the high pressure to the lower pressure ports; said valve rotor further comprising a centrally mounted shaft operable to selectively connect inlet and outlet ports; said valve further comprising a rotational means on the shaft of the valve rotor, a drive gear cooperative with the rotational means and comprising a top face and a bottom face, the top face being sloped so as to form a cam such that when the drive gear is rotated the rotational means may be raised and lowered by the camming action. The drive gear may be of any suitable form. The drive gear may be a worm wheel. The worm wheel may be driven by a worm gear. The worm gear may in turn be driven by a motor means of any suitable type. An electric motor is preferred. An A.C. motor has been found to be suitable.

The rotational means in use acts as a cam follower. The rotational means may be in the form of a wheel. The rotational means may comprise a geneva wheel having a plurality of spokes, each spoke comprising a pair of outwardly diverging arms terminating at the distal end in a concave locking face, and adjacent spokes defining a slot therebetween.

The drive gear may further comprise a geneva actuating peg mounted proximate the circumference of the drive gear and a crescent-shaped locking mechanism centrally mounted on the top face of the drive gear and cooperative with the concave locking face of a spoke of the geneva wheel so that as the drive gear rotates the peg contacts, and is released from, the slot formed between adjacent spokes. The geneva wheel may have as many spokes as are necessary depending on the number of valve ports. For a swimming pool filter application six spokes have been found suitable. The valve in one rotation of the drive gear allows for the valve rotor to be raised as the cam surface of the drive gear rotates, rotated by the action of the peg through a particular angle determined by the number of slots and spokes in the geneva wheel and then lowered back into position on the valve seat. The embodiment discussed above has the particular advantage that there is the necessity for only a single motor for both vertical and rotational motion.

The motor-operable fluid valve may further comprise a function indicator wheel mounted on the shaft of the valve rotor above the geneva wheel. The function indicator wheel may be separate from, or may be integral with, the geneva wheel.

The embodiment discussed above comprises a motoroperable fluid valve rather than an automatic fluid valve. In some embodiments this may be sufficient e.g. where regular inspection is provided of the filter medium used for example with a swimming pool. However, in order to render the fluid valve automatic some form of sensing, timing and activating arrangement is necessary.

In certain embodiments, such as in use with a filter, e.g. in a swimming pool filtering system, the automatic fluid valve may be activated by the level of contamination of the filtering medium. In certain prior art devices, this has been achieved by measuring the back pressure in total offered to the pump. The disadvantages of this method have been discussed above.

In order to overcome such disadvantages, in the present invention there is provided an activating means. The valve rotor in this form may be of the bonnet type i.e. the valve rotor may comprise a bonnet or dome-shaped outer wall. The bonnet or dome-shaped body may be divided by a centrally positioned wall into an inlet section and an outlet section. The inlet section may define a hollow inlet chamber. A pressure differential sensor may be positioned in the outer wall of the valve rotor for sensing the pressure differential between the outlet section and the open central portion of the valve body. In this form, the sensor measures the pressure differential directly between the high pressure inlet port and a low pressure outlet port when the valve rotor is in position. This provides a more accurate guide as to the state of the filter than has been possible with prior art devices.

The sensor may be of the diaphragm type. The sensor may comprise an activating means. The activating means may be of the magnetic type, for example, a permanent magnet. The magnet may be arranged to co-act with a switching means. The switching means may conveniently be mounted on the top of the valve body. The switching means may be positioned relative to the magnet such that variation of the position of the diaphragm controlling movement of the magnet will activate the switching means. The switching means may take the form of a reed switch. It will be appreciated that this arrangement is advantageous as deactivation of the sensing means is automatically achieved by rotation of the valve rotor.

The pressure differential diaphragm may be of the rolling type. The pressure differential diaphragm, when a significant pressure drop occurs will tend to move downwardly. Accordingly, the diaphragm may be provided with a biasing means to return it to its original position. The biasing means may be a spring, for example a coil spring. In order to improve the sensitivity of the unit, the magnet may be carried on the end of a lever. The lever may be provided with a biasing means against the bias of the pressure differential diaphragm to achieve the action desired.

In certain embodiments the valve rotor is held in a series of positions for differing amounts of time during a functional cycle. It is accordingly desirable to provide a control means for use with the automatic fluid valve of the present invention. It would be particularly desirable if a simple means could be provided to control both the position of the valve rotor and the time spent in any one position during a functional cycle. In an embodiment suitable for use with a swimming pool filtration system, the valve is held in the filter position for most of the time. When activated, the valve will first be advanced to the backwash position and held there for a predetermined period normally sufficient to restore the efficiency of the filter medium. Next the cycle may move to the "rinse" position for a relatively short period and finally the valve returns to the "filter" position. Where a rinse cycle is required a 6-port valve is used.

Naturally during rotation of the valve rotor the swimming pool pump should be deactivated to prevent damage to the system. Thus there is a requirement for a control means which will allow alternative activation of the motor means and the pump, and some means allowing for timing of the backwash and rinse processes.

Preferably the valve further comprises a control means adapted to control the position of the valve rotor and the time spent in any one position during a functional cycle. The control means may be energised by a signal from the actuating means. The control switch means may be activated by contact with contact points positioned at appropriate intervals on the base of the geneva wheel or other rotational means.

In the swimming pool valve arrangement a single contact point may be provided on the base of the rotational means corresponding to the filtration position. Two contact points may be provided corresponding to the back wash position and three contact points corresponding to the rinse position. The timing device may comprise a mechanical timer. However, it is preferred to use a timing circuit for this purpose. The timing circuit may comprise two selectable time delays and timer unit.

The control means further comprises a relay having at least one normally open (NO) and one normally closed (NC) switch. Two sets of normally open switches and two sets of normally closed switches are preferred. For safety, one switch is connected to the active and the second to the neutral. The normally open switch or switches is associated with the motor means. The normally closed switch is associated with the pump means. The activation of the relay opens the normally closed switch and closes the normally open switch, thus activating the motor means and simultaneously deactivating the pump. The control switch means may be positioned so as to co-act with the contact points on the drive gear.

The control switch means may comprise a plurality of limit switches although any proximity-type switching arrangement e.g. of the microswitch type may be used. The first of the switches, when contact is made, de-energises the relay device. The second of said switches, when contact is made, is adapted to initiate the timing circuit, select one of the time delays, re-energise the relay device, and decouple the differential pressure switch. The third of said switches when required completes the circuit to the second time delay thus providing two selectable time delays. At the end of the timing sequence the relay is re-energised. Preferably, the control switch means further comprises a normally closed switch mounted below the bottom of the drive gear and associated with the motor for deactivating the motor when the drive gear assumes a predetermined rotational position defined by a contact point on the bottom face of the drive gear. In the "parked" position, the contacts are held open.

In every other position except the parked position for the drive gear the contacts are closed, completing the circuit to the relay thus ensuring that the drive gear continues to rotate until the switch contacts are opened again in the parked position. This ensures that the components of the multi-port valve are precisely aligned.

Preferably, the control means further comprises means for energising the motor for rotation of a gear independent of the rotation caused by the control switch means. One further microswitch may be included in the circuit and the function is such that whenever the microswitch is activated the relay is automatically energised irrespective of the position of, or control of, the other switches or timers.

The reason for the by-pass normally open switch is that one of the positions of any six position multiport valve is a "closed" position where water from the pump cannot be directed anywhere. The closed position is not normally used in any pool configuration. When operating the valve in the manual mode, the user can move the valve around to the closed position in which position the pump will be activated and the valve will be pressurised to the maximum stall pressure of the pump (if operated for some time this will damage the pump). By placing a further by-pass switch in the central means as described above the valve can be forced to by-pass the "closed" position and hence avoid the problem of accidental engagement.

Additionally, for control of systems other than pool filters, this provides an advantageous by-pass function of any position that is not wanted, requiring simply energising of this switch to move the valve to the next position.

In the timing circuit, the timer unit may be an integrated circuit adapted to act as a timer. The integrated circuit designated 555 or equivalent may be used. The selectable time delays may be provided by timing components coupled to the integrated circuit. The timing components may comprise two series connected resistor-capacitor combinations. Alternatively a single timing capacitor may be provided and be selectively switchable into series connection with one of the two timing resistors. If desired, one or both timing resistors may be adjustable so as to enable one or both of the selectable time delay periods to be varied.

The control means described above has the particular advantage that all functions are controlled by merely four microswitches. This may be compared with the prior art where each position and each function may be controlled by an individual microswitch. Moreover, the timing circuit has the further advantage that a single timer may be used for dual timing functions.

In a further aspect of the present invention there is provided a filter apparatus which comprises a filter unit and a motor-operable automatic fluid valve mounted directly on, and in direct fluid communication with the filter. The filter may be of the sand type. It would be understood that due to the particular advantages of the automatic fluid valve discussed above it is possible for it to be manufactured in a particularly compact form and to function directly with a sand filter without the necessity for complicated and costly conduit connections. The automatic fluid valve may be mounted directly on the top of the filter in which arrangement there is only the necessity for an inlet leading to the top of the sand box and an outlet conduit from the base of the sand box within the sand filter unit. All other conduit connections for the various inlets and outlets necessary for a swimming pool filter system may be arranged directly from the fluid valve.

To further assist in the understanding of the present invention a preferred embodiment of the invention will now be described in relation to the accompanying drawings. It should be understood however that the following description is illustrative only and should not be taken in any way to be limiting on the general aspects of the present invention.

FIG. 4 is a top view of a valve rotor according to the present invention.

FIG. 5 is a cross-sectional view of the embodiment of FIG. 4 along lines V—V.

Figure 1:
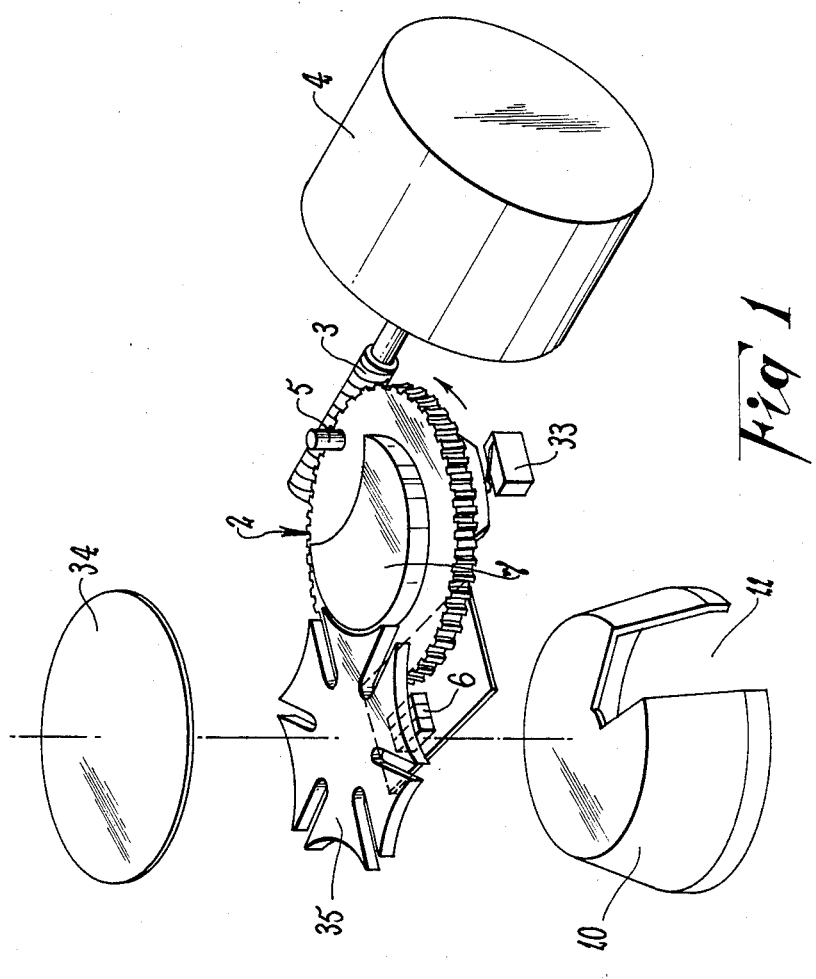
FIG. 1 is a schematic representation of an embodiment of an automatic fluid valve according to the present invention.
Figure 2:
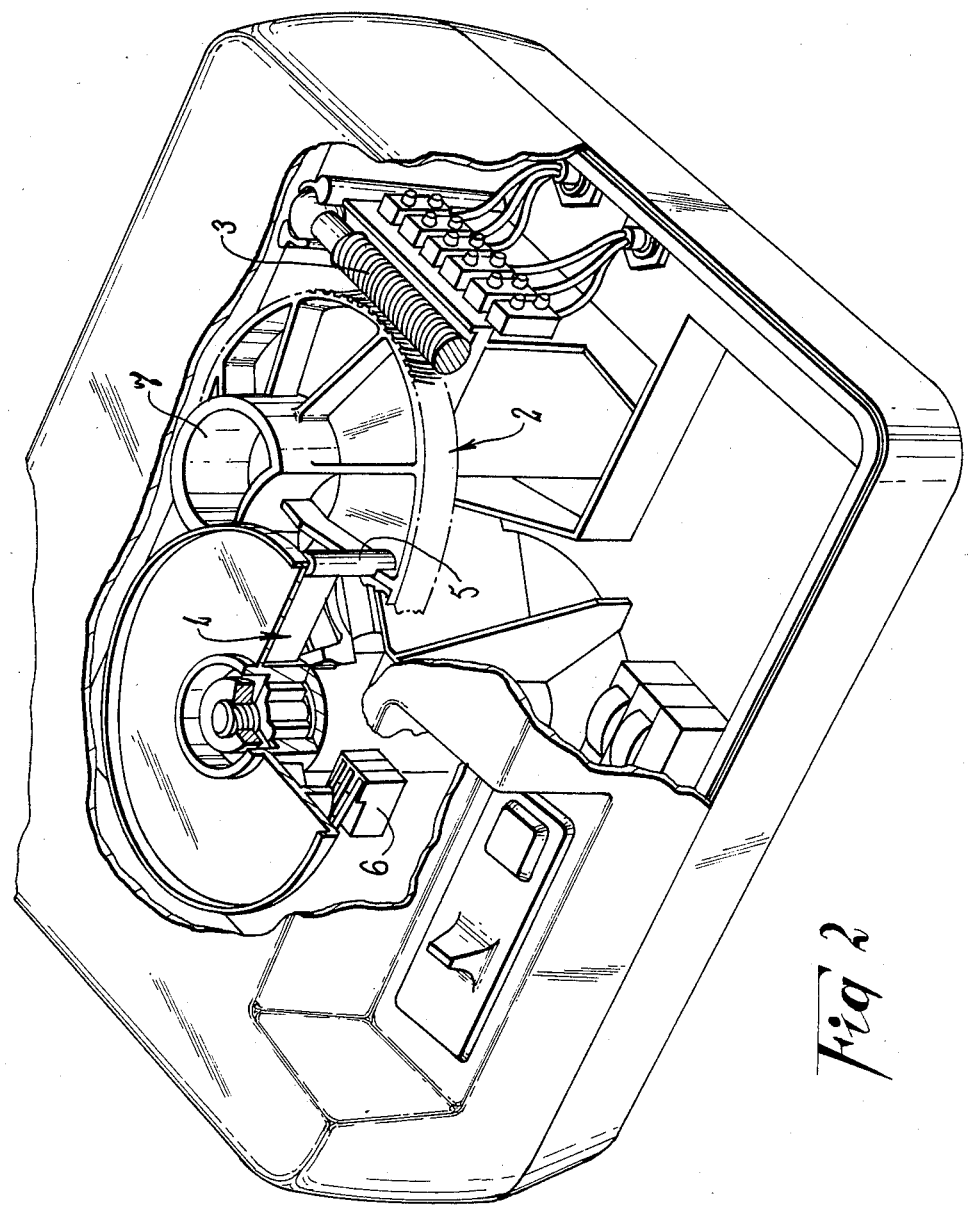
FIG. 2 is a partial cutaway top view of an automatic fluid valve according to the present invention.

FIG. 2 shows a partial cutaway view of the automatic fluid valve described in FIG. 1. In FIG. 2 there is shown a geneva wheel 1 coacting with a worm wheel 2 and worm drive 3. One end of the worm drive 3 is mounted in a spherical bearing arrangement. The other end co-acts with the motor means 4 (see FIG. 1).

The automatic fluid valve is shown at a point where the geneva wheel has just released the peg 5 on the worm wheel and is about to contact the crescent-shaped locking mechanism 7. The geneva wheel may also be in contact with one or more of the three micro-switches 6 via contact points (not shown) depending on where in the cycle the view is taken.

Figure 3:
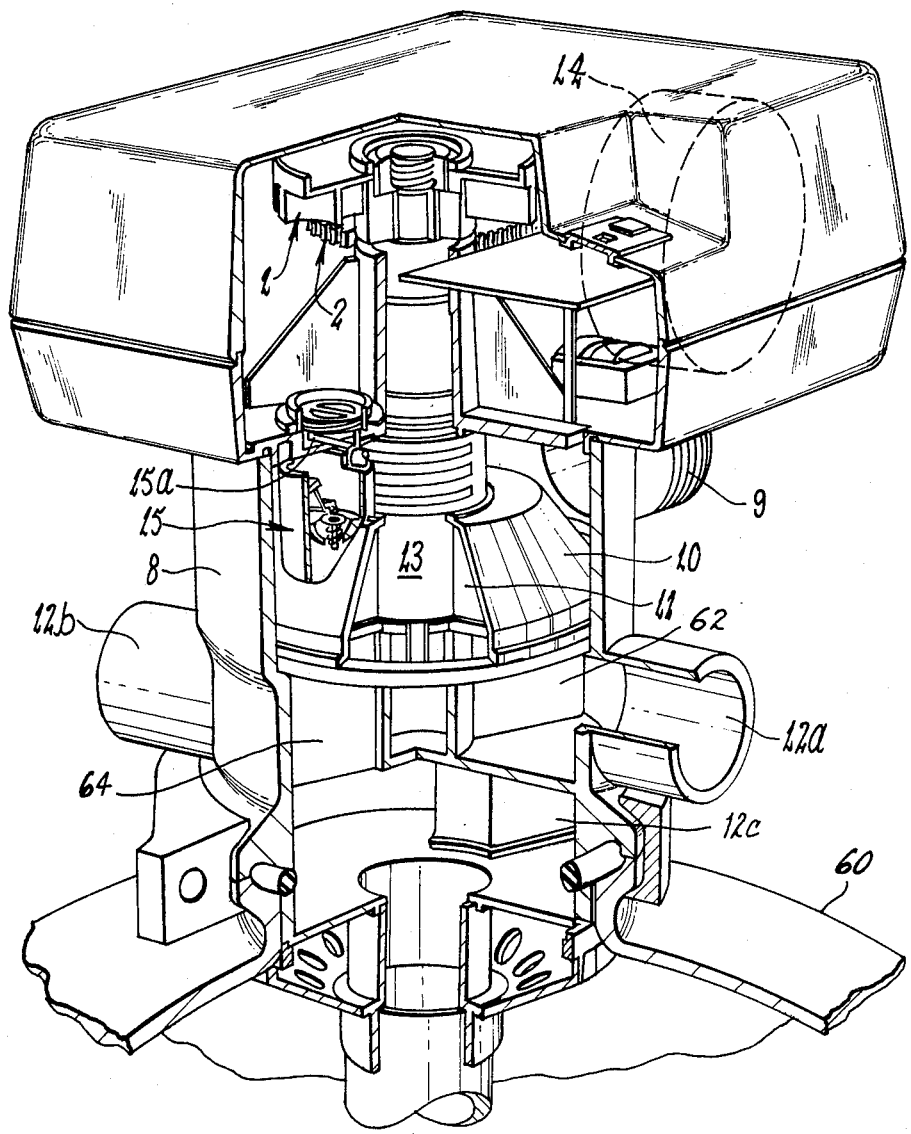
FIG. 3 is a partial cutaway side view of the embodiment represented in FIG. 2.

In more detail, FIG. 3 represents an automatic hydraulic valve mounted on a sand-filter (not shown). The automatic fluid valve comprises a valve housing 8, a high pressure inlet port 9, a valve rotor or bonnet 10 having an opening 11 movably disposed within the open portion of the valve housing 8 between the line of flow from the high pressure inlet port 9 to either of the low pressure ports 12A and 12B. The valve rotor is provided with a centrally mounted shaft 13 on which is mounted the geneva wheel 1. An electric motor means 14 is provided to power the worm gear (not shown). A pressure differential sensor 15 is positioned in the outer wall of the outlet section of the body of the bonnet or domeshaped valve rotor. The sensor comprises an activating switch means 15a of the reed switch type.

Valve rotor 10 is rotatable to selectively provide communication, through opening 11, between inlet port 9, and either of outlet port 12a, outlet port 12b, or wedge-shaped passageway 12c that extends to tank 60, which can be, for example, a sand-containing filter for a swimming pool. The communication is provided through one or more individual wedge-shaped chambers that underlie valve rotor 10 and extend radially outwardly from cylindrical housing 13a that rotatably receives the lower portion of shaft 13, such as chamber 62, which opens into port 12a, or chamber 64, which opens into port 12b. Thus, by properly positioning opening 11 relative to the appropriate wedge-shaped chambers, the direction of flow from inlet port 9 can be directed as desired.

FIG. 5 is a cross-sectional view of the valve rotor or bonnet 10 in FIG. 4 and centrally mounted shaft 13 as depicted in FIG. 3. FIG. 5 shows a pressure differential sensor 15 which comprises a magnet 16 carried by a lever 17. The lever 17 is adapted to co-act with the pressure differential diaphragm 18 and the activating switch means (not shown). The pressure differential diaphragm and lever are biased against the movement caused by a differential pressure increase via biasing means 19 and 19A. The combination of these two biasing means creates the reaction required to follow the movement of the diaphragm. A combination of a "torsion" spring 19A on the lever arm and a coil spring 19 beneath the pressure differential diaphragm has been found to be suitable. This allows for sensitivity to small changes in the pressure differential but allows the system to also react to large change where the lighter spring is of no effect.

Figure 7:
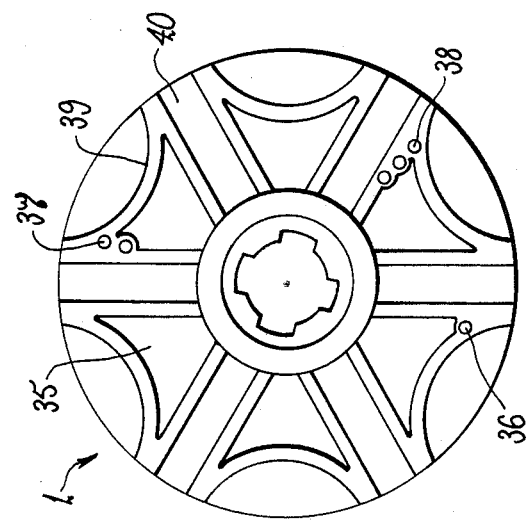
FIGS. 6 and 7 are, respectively, a top and bottom view of a geneva wheel which may be used in the fluid valve of the present invention.
Figure 6:
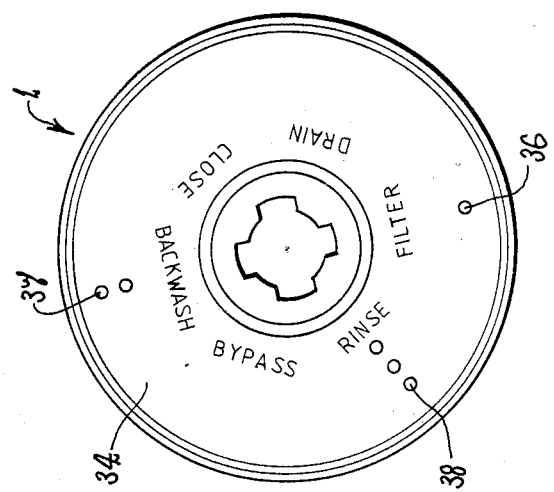

FIG. 6 and 7 show a geneva wheel 1 having an integral function indicator wheel 34. The geneva wheel 1 comprises spokes 35. The geneva wheel 1 carries contacts 36, 37 and 38 which comprises 1, 2 and 3 contact points respectively. These contact points may be formed by screws which pass through the geneva wheel. The spokes of the geneva wheel 1 are each provided with concave locking faces 39 and adjacent spokes define slots 40 for the geneva actuating peg. The contact 36 is adapted to co-act with geneva position switch 27 discussed below. The contact 37 is adapted to co-act with the geneva position switch 27 and the time initiate switch 26. The contact 38 is adapted to co-act with switches 26 and 27 as well as time delay selector switch 32. Accordingly, contact 37, in the swimming pool embodiment, corresponds to the back wash position and contact 38 corresponds to the rinse position whilst contact 36 corresponds to the filter position.

Figure 8:
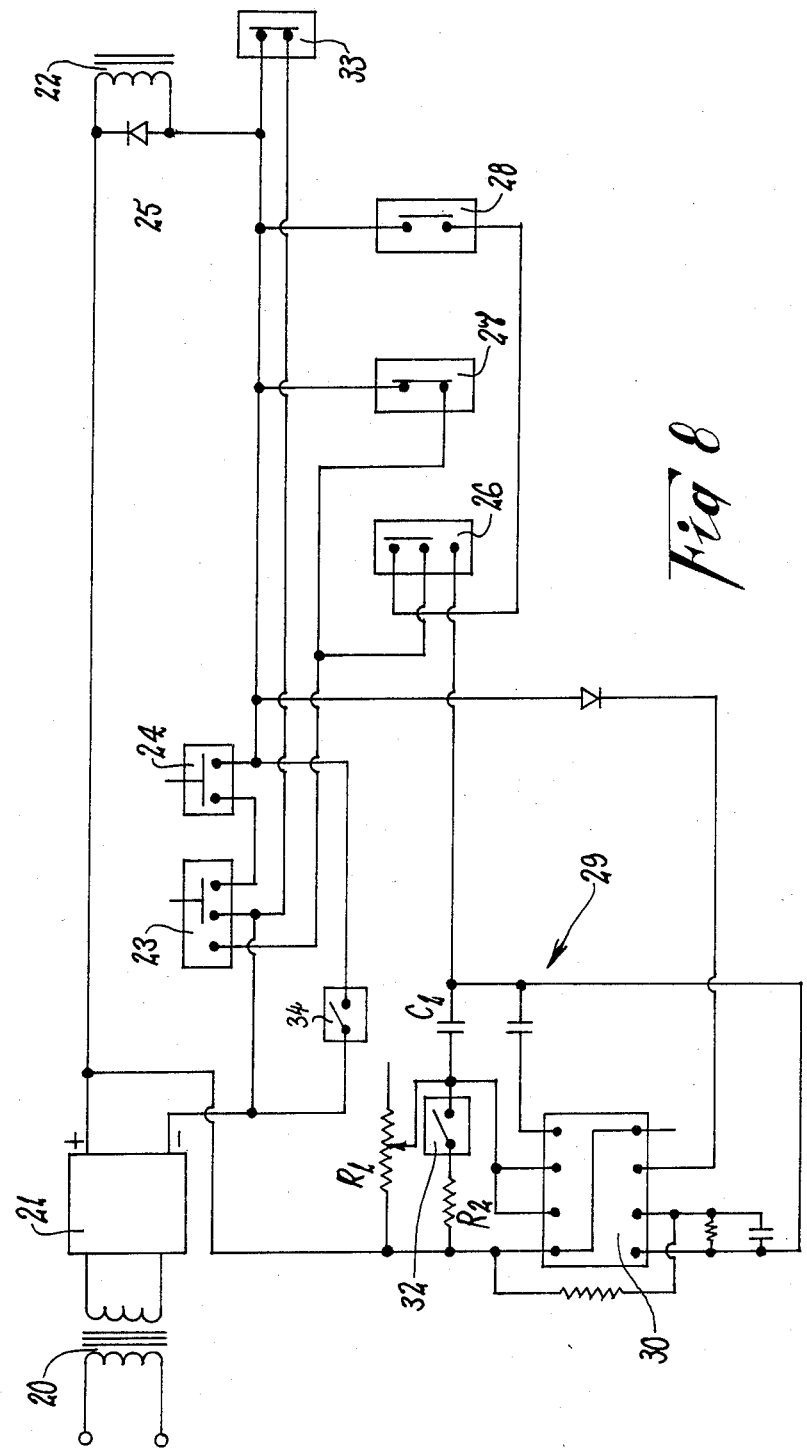
FIG. 8 represents an embodiment of an electric circuit which may be used in the automatic fluid valve of the present invention.

The circuit described in FIG. 8 comprises stepdown transfer 20 in combination with a rectifier 21. Preferably a full-wave rectifier is used. These function in combination with the relays 22 and auto-manual and manual index switches 23 and 24. The auto-manual switch shown is of the toggle type and the manual index switch is of the push-button type but any form of switch may be used.

It should be understood that relay 22 has 2 sets of normally open and 2 sets of normally closed contacts. The normally closed contacts connect AC power to the pump (not shown). The normally open contacts, when closed supply power to the valve motor which turns the worm wheel (also not shown). Park micro-switch 33 is normally closed but is opened when worm wheel is in the correct position. When the wheel moves from the park position the park micro-switch closes again.

The manual index switch 24 functions to momentarily energise relay 22 to rotate the geneva wheel. Once the worm wheel is in the park position, the park microswitch 33 opens to de-energise relay 22 so that the individual components of the automatic hydraulic valve are correctly aligned at pump start-ups or for manual operation. At this stage auto-manual switch 23 is in the manual position and bridges the centre and right contacts as shown. In the automatic mode auto-manual switch 23 is in the position (not shown) in which it bridges the left and centre contacts. This ensures that relay 22 is energised via geneva position switch 27 unless the geneva wheel is in the filter, backwash or rinse positions. Thus the pump operates when the geneva wheel is in these positions. The diode 25 is optional and merely provides back e.m.f. protection for the relay 22.

The circuit may further comprise a further bypass microswitch 33. This is a normally open switch and functions to energise the relay irrespective of the position of, or control of, the other switches, for safety and other reasons as discussed above.

The geneva position switch 27 is normally closed but is opened when the wheel is in the filter, backwash or rinse position.

The reed switch 28 is normally open but is closed by the magnet when the appropriate pressure differential is sensed across the diaphragm. This initiates index action of the geneva wheel.

When the geneva wheel has indexed to the first position (e.g. backwash) timer initiate switch 26 moves to bridge the centre and bottom contacts. Negative supply is accordingly coupled to the timer unit (preferably an integrated circuit) 30 of the timing circuit 29. The integrated circuit may be of the LM 555 type. The timer unit times a delay which is depedent on resistor "$R_1$" and capacitor "$C_1$". Resistor "$R_1$" is preferably a variable resistor. This enables the timer unit to act as a monostable flip flop to provide a output at pin 3. This causes the relay 22 to be de-energised for the required first time period. When the first time period is completed the pin 3 goes low and the relay 22 is energised to index the geneva wheel. At a desired position of the geneva wheel (e.g. rinse position) time initiate switch 26 and timer shorten switch 32 is also closed e.g. via a contact carried by the geneva wheel, as discussed above, and a shortened second time period is accordingly provided. Having now described our invention what we claim as new and desire to secure by Letters Patent is:

1. A motor-operable fluid valve for a pump, said valve comprising a valve body defining an open central portion, means defining at least one high pressure inlet port in fluid communication with the open central portion, means defining a plurality of lower pressure inlet and/or outlet ports in fluid communication with the open central portion via an array of individual flow passages and a valve rotor means comprising a rotor having means defining a plurality of openings and disposed for movement in both rotation and translation within the open central portion in the line of flow from the high pressure to the lower pressure ports and a centrally mounted shaft operable to rotate and translate the rotor selectively, relative to the axis of the shaft, to connect selected inlet and outlet ports; said valve further comprising a rotational means carried on the shaft of the valve rotor; wherein the rotational means cooperates with a drive gear and in that the drive gear includes a top face and a bottom face, of which the top face is sloped so as to form a cam surface against which a bottom face of the rotational means acts as a cam follower, such that when the drive gear is rotated the rotational means and hence the valve rotor are raised and lowered by the camming action.

2. A motor-operable fluid valve as defined in claim 1 wherein the rotational means comprises a geneva wheel having a plurality of spokes, each spoke comprising a pair of outwardly diverging arms terminating at the distal end in a concave locking face, and adjacent spokes defining a slot therebetween.

3. A motor-operable fluid valve as defined in claim 2 wherein the drive gear further comprises a geneva actuating peg mounted proximate the circumference of the drive gear and a crescent-shaped locking mechanism centrally mounted on the top face of the drive gear and cooperative with the concave locking face of a spoke of the geneva wheel so that as the drive gear rotates the peg engages, and is released from, the slot formed between adjacent spokes.

4. A motor-operable fluid valve as defined in claim 3 wherein the drive gear is a worm wheel and the valve further comprises a worm gear to drive the worm wheel.

5. A motor-operable fluid valve as defined in claim 1 wherein the valve rotor comprises a bonnet or dome-shaped outer wall and is divided internally by a centrally positioned wall into an inlet section and an outlet section.

6. An automatic fluid valve comprising a motoroperable fluid valve as defined in claim 5 and further comprising an activating means adapted to activate the valve.

7. An automatic fluid valve as defined in claim 6 wherein the valve further comprises a pressure differential sensor positioned in the outer wall of the valve rotor for sensing the pressure differential between the outlet section and the open central portion of the valve body.

8. An automatic fluid valve as defined in claim 7 wherein the sensor is a diaphragm sensor and comprises a magnetic actuating means for operating an activating switch means the activating switch means being positioned relative to the magnetic actuating means such that variation of the position of the diaphragm controls movement of the magnetic actuating means to activate the activating switch means.

9. An automatic fluid valve as defined in claim 8 wherein the activating switch means is a reed switch and the sensor is a pressure differential diaphragm of the rolling type and is provided with a biasing means.

10. An automatic fluid valve as defined in claim 1 which further comprises a control means adapted to control both the position of the valve rotor and the time spent in any one position during a functional cycle.

11. An automatic fluid valve as defined in claim 10 wherein the control means is adapted to be energised by a signal from a sensor; said control means comprising a timing device and a plurality of control switch means, the control switch means being activated by contact points positioned at appropriate intervals on the base of the rotational means.

12. An automatic fluid valve as defined in claim 11 wherein one said contact point is provided on the base of the rotational means corresponding to a filtration position; two said contact points are provided corresponding to a backwash position and three said contact points are provided corresponding to a rinse position.

13. An automatic fluid valve according to claim 12 wherein the timing device comprises a timing circuit defining two selectable time delays.

14. An automatic fluid valve as defined in claim 13 wherein the control means further comprises a relay having at least one normally open and one normally closed switch, the at least one normally open switch being associated with the motor, the at least one normally closed switch being associated with a pump such that activation of the relay opens the normally closed switch and closes the normally open switch thus activating the motor and simultaneously deactivating the pump.

15. An automatic fluid valve as defined in claim 14 wherein said sensor comprises a pressure differential sensor positioned in the outer wall of the valve rotor for sensing the pressure differential between the outlet section and the open central portion of the valve body.

16. An automatic fluid valve as defined in claim 15 wherein the sensor is a diaphragm sensor and comprises a magnetic actuating means for operating an activating switch means the activating switch means being positioned relative to the magnetic actuating means such that variation of the position of the diaphragm controls movement of the magnetic actuating means to activate the activating switch means.

17. An automatic fluid valve as defined in claim 16 wherein the activating switch means is a reed switch and the sensor is a pressure differential diaphragm of the rolling type and is provided with a biasing means.

18. An automatic fluid valve as defined in claim 17 wherein the control switch means comprises a plurality of limit switches arranged such that the first of the limit switches, when contact is made, energises the relay device, the second of said switches, when contact is made, initiates the timing circuit, selects one of the time delays, deenergises the relay and deactivates the actuating switch means and the third of said switches selects the other time delay.

19. An automatic fluid valve as defined in claim 18 wherein the control switch means further comprises a normally closed switch mounted below the bottom of the drive gear and associated with the motor for deactivating the motor when the drive gear assumes a predetermined rotational position defined by a contact point on the bottom face of the drive gear.

20. An automatic fluid valve as defined in claim 16 wherein the control means further comprises means for energising the motor for rotation of a gear independent of the rotation caused by the control switch means.

21. An automatic fluid valve as defined in claim 20 wherein the energising means includes a by-pass switch for energising the relay.

* * * * *